D. LOMBARD.
Corn Husker.
No. 19,326.
Patented Feb. 9, 1858.
Fig. 1,
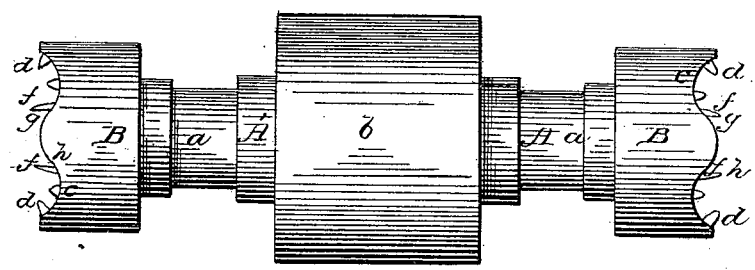
Fig. 2,
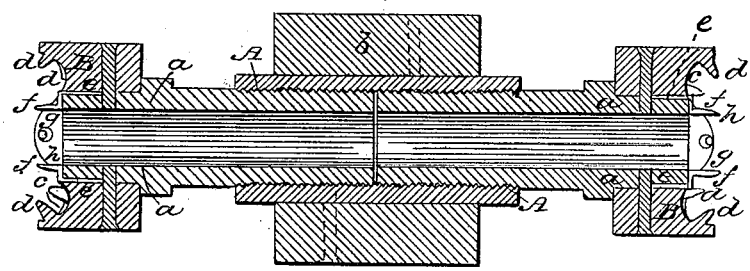
Fig. 3,
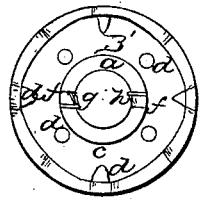
Fig. 4,
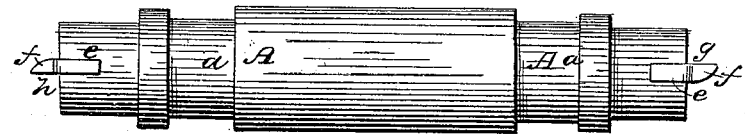

UNITED STATES PATENT OFFICE.

DANIEL LOMBARD, OF BOSTON, MASSACHUSETTS, ASSIGNOR TO HIMSELF AND GEO. F. RICHARDSON, OF SAME PLACE.

CORN-HUSKER.

Specification of Letters Patent No. 19,326, dated February 9, 1858.

*To all whom it may concern:*

Be it known that I, DANIEL LOMBARD, of Boston, in the county of Suffolk and State of Massachusetts, have invented a new and useful Corn-Husker; and I do hereby declare that the same is fully described and represented in the following specification and the accompanying drawings, of which—

Figure 1, denotes a side view of two of said corn huskers, as applied to one shaft or arbor; Fig. 2, a vertical, central and longitudinal section of the same; Fig. 3, an end view of one of the corn huskers. Fig. 4, is a top view of the tubular shaft and the cutters of the corn husker.

In these drawings, A, denotes a tubular shaft or arbor furnished with two journals, $a$, $a$, a driving pulley, $b$, and a corn husker, B or B', affixed on each end of the shaft.

In order to use the machine, the arbor should be supported in suitable boxes or bearings, and the driving pulley should have an endless band applied to it such band being also applied to a drum or wheel having means by which it may be put in rotation.

The corn husker consists of a chuck $c$, made concave on one side and furnished with spurs (or equivalent devices) arranged within its concavity and projecting therefrom as shown at, $d$, $d$, $d$, $d$, in the drawings. This chuck is fastened firmly on the tubular shaft which projects a short distance above the concave surface of the chuck and is formed with a cylindrical cavity or recess $e$, and carries two knives or cutters $f$, $f$, arranged on it and so as to project beyond the concave surface of the chuck as shown in the drawings. Each of the said cutters or knives is provided with two cutting edges, $g$, $h$, arranged at or about at a right angle to one another, such edges being for the purpose of reducing the stalk of an ear of corn, and separating the husk from the ear at their junction therewith, the spurs serving to so disengage the husks from the ear of corn, after the knives may have performed their office thereon as to enable the ear to be easily discharged from the husks while they are grasped by the hand of a person, at the point of the ear.

It is not essential to my invention that the shaft and the chuck be constructed in two separate pieces as they may be made in one piece and be formed with a suitable cylindrical cavity for the reception of the stalk of the ear of corn.

In operating with this corn husker while it is in rotation, it is only necessary to insert the stalk of an ear of corn in the central cavity and to press it therein axially of the shaft until the knives or cutters shall reduce the stalk and cut through the joinings of the husks sufficiently to separate them from the ear the spurs in the meantime serving to completely disengage the husks from the ear, so that while the husks are held in the hand and the ear is withdrawn from the cavity of the corn husker, the said ear will readily drop from the husks provided they are still grasped in the hand applied at their upper ends.

What I claim as my invention is—

A corn husker constructed of a chuck mounted on a tubular shaft or provided with a central cavity, and having cutters and spurs arranged with respect to the bore or cavity substantially as specified.

In testimony whereof I have hereunto set my signature.

DANIEL LOMBARD.

Witnesses:
R. H. EDDY,
CALEB EDDY.